United States Patent
Sherman et al.

(10) Patent No.: US 7,590,844 B1
(45) Date of Patent: Sep. 15, 2009

(54) DECRYPTION SYSTEM AND METHOD FOR NETWORK ANALYZERS AND SECURITY PROGRAMS

(75) Inventors: David L. Sherman, Mt. Airy, MD (US); Daniel F. Sterne, Ellicott, MD (US); Geoffrey T. Lawler, Baltimore, MD (US); Michael D. Heyman, Rockville, MD (US)

(73) Assignee: McAfee, Inc., Santa Clara, CA (US)

( * ) Notice: Subject to any disclaimer, the term of this patent is extended or adjusted under 35 U.S.C. 154(b) by 1538 days.

(21) Appl. No.: 10/133,792

(22) Filed: Apr. 26, 2002

(51) Int. Cl.
*H04K 1/00* (2006.01)
*H04L 9/32* (2006.01)

(52) U.S. Cl. .................... 713/171; 380/255; 380/277

(58) Field of Classification Search .................... None
See application file for complete search history.

(56) References Cited

U.S. PATENT DOCUMENTS

| | | | | |
|---|---|---|---|---|
| 4,912,762 A | * | 3/1990 | Lee et al. ....................... | 705/71 |
| 5,835,722 A | * | 11/1998 | Bradshaw et al. ............ | 709/225 |
| 5,987,611 A | * | 11/1999 | Freund ........................... | 726/4 |
| 6,005,939 A | * | 12/1999 | Fortenberry et al. ........... | 705/76 |
| 6,199,113 B1 | * | 3/2001 | Alegre et al. .................. | 709/229 |
| 6,215,877 B1 | * | 4/2001 | Matsumoto .................... | 380/277 |
| 6,233,618 B1 | * | 5/2001 | Shannon ........................ | 709/229 |
| 6,711,264 B1 | * | 3/2004 | Matsumoto et al. ........... | 380/283 |
| 6,742,116 B1 | * | 5/2004 | Matsui et al. .................. | 713/171 |
| 2001/0016836 A1 | * | 8/2001 | Boccon-Gibod et al. ...... | 705/51 |
| 2002/0154781 A1 | * | 10/2002 | Sowa et al. .................... | 380/278 |

FOREIGN PATENT DOCUMENTS

| | | |
|---|---|---|
| EP | 1 130 492 A2 | 5/2001 |
| EP | 1 164 745 A2 | 12/2001 |

OTHER PUBLICATIONS

"shim definition | Dictionary.com", printed on Apr. 17, 2009, pp. 1-2.*
"Shim(computing)—Wikipedia, the free encyclopedia", printed Apr. 17, 2009, pp. 1-2.*

* cited by examiner

*Primary Examiner*—Ponnoreay Pich
(74) *Attorney, Agent, or Firm*—Zilka-Kotab, PC (57) ABSTRACT

A system, method and computer program product are provided for decrypting network communications. Initially, encrypted network communications are identified. A key is then received. Such key is subsequently utilized to decrypt the encrypted network communications. In use, the key is conditionally received based on predetermined criteria.

16 Claims, 10 Drawing Sheets

DECRYPTION SYSTEM AND METHOD FOR NETWORK ANALYZERS AND SECURITY PROGRAMS

FIELD OF THE INVENTION

The present invention relates to cryptography, and more particularly to the use of cryptography in the context of network analyzer engines and security programs.

BACKGROUND OF THE INVENTION

Numerous tools have been developed to aid in network management.

One example of such tools is a "network analyzer." In general, a network analyzer is a program that monitors and analyzes network traffic, detecting bottlenecks and problems. Using this information, a network manager can keep traffic flowing efficiently. A network analyzer may also be used to capture data being transmitted on a network. The term "network analyzer" may further be used to describe a program that analyzes data other than network traffic, or may also be used to classify packets into flows. For example, a database can be analyzed for certain kinds of duplication. One example of a network analyzer is the SNIFFER® product manufactured by NETWORK ASSOCIATES, INC®.

Another example of such tools developed to aid in network management is security programs. Security programs, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

Figure 1A:
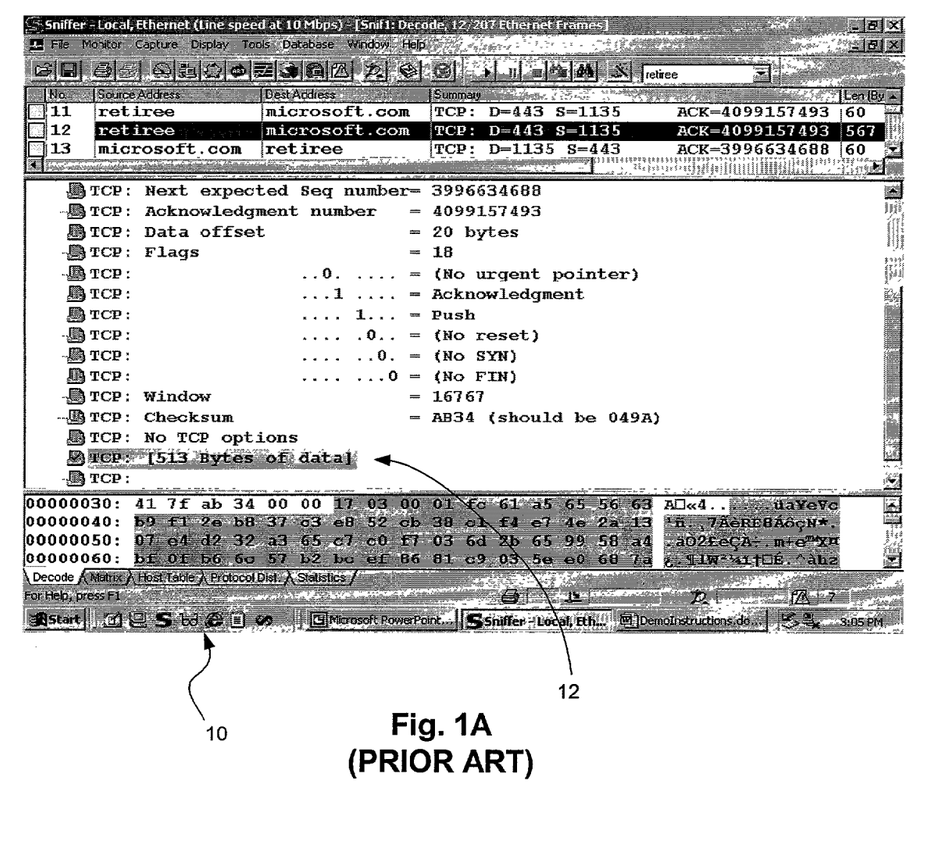
FIG. 1A illustrates a typical network analyzer interface that displays network traffic information generically and without detail (i.e. indicating only an "amount" of data) due to encrypted network traffic.

Unfortunately, the encryption of network traffic [i.e. using secure socket layer (SSL), Internet Protocol Security (IP-SEC), etc.] often makes it impossible for network administrators to use the foregoing network management tools, since the traffic can not be analyzed. For example, Prior Art FIG. 1A illustrates a typical network analyzer interface 10 that displays network traffic information 12 generically and without detail (i.e. indicating only an "amount" of data) due to encrypted network traffic.

Since the network traffic is encrypted, the aforementioned network management tools may not be used to scan, analyze and/or troubleshoot the network. Unfortunately, this causes the network to be less secure and efficient. There is thus a need for providing network management tools with access to encrypted network traffic.

DISCLOSURE OF THE INVENTION

A system, method and computer program product are provided for decrypting network communications. Initially, encrypted network communications are identified. A key is then received. Such key is subsequently utilized to decrypt the encrypted network communications. In use, the key is conditionally received based on predetermined criteria.

In one embodiment, the key may be used to decrypt the encrypted network communications utilizing a tool. Such tool may take the form of a security program, a network analyzer, or any other type of network software.

In another embodiment, the key may be received from a key broker module. Such key broker module may conditionally receive the key based on a policy. Moreover, the key broker module may conditionally receive the key from a cryptographic interceptor module coupled between an application (i.e. a web browser, etc.) and a cryptographic supplier. As an option, the keys may be indexed by the key broker module.

In one aspect of the present embodiment, a request from the application for encrypted network communications over a network may be identified. In response to such request, a policy may be identified utilizing the cryptographic interceptor module. Thus, the key associated with the encrypted network communications may be conditionally intercepted based on the policy utilizing the cryptographic interceptor module.

In yet another embodiment, the key may be received in response to a request made by the aforementioned tool. Such request may include information. In use, the key may be conditionally received based on whether the information meets the predetermined criteria.

As an option, the key may be encrypted. Moreover, the key may be decrypted based on user input.

BRIEF DESCRIPTION OF THE DRAWINGS

Prior Art

DESCRIPTION OF THE PREFERRED EMBODIMENTS

Figure 1B:
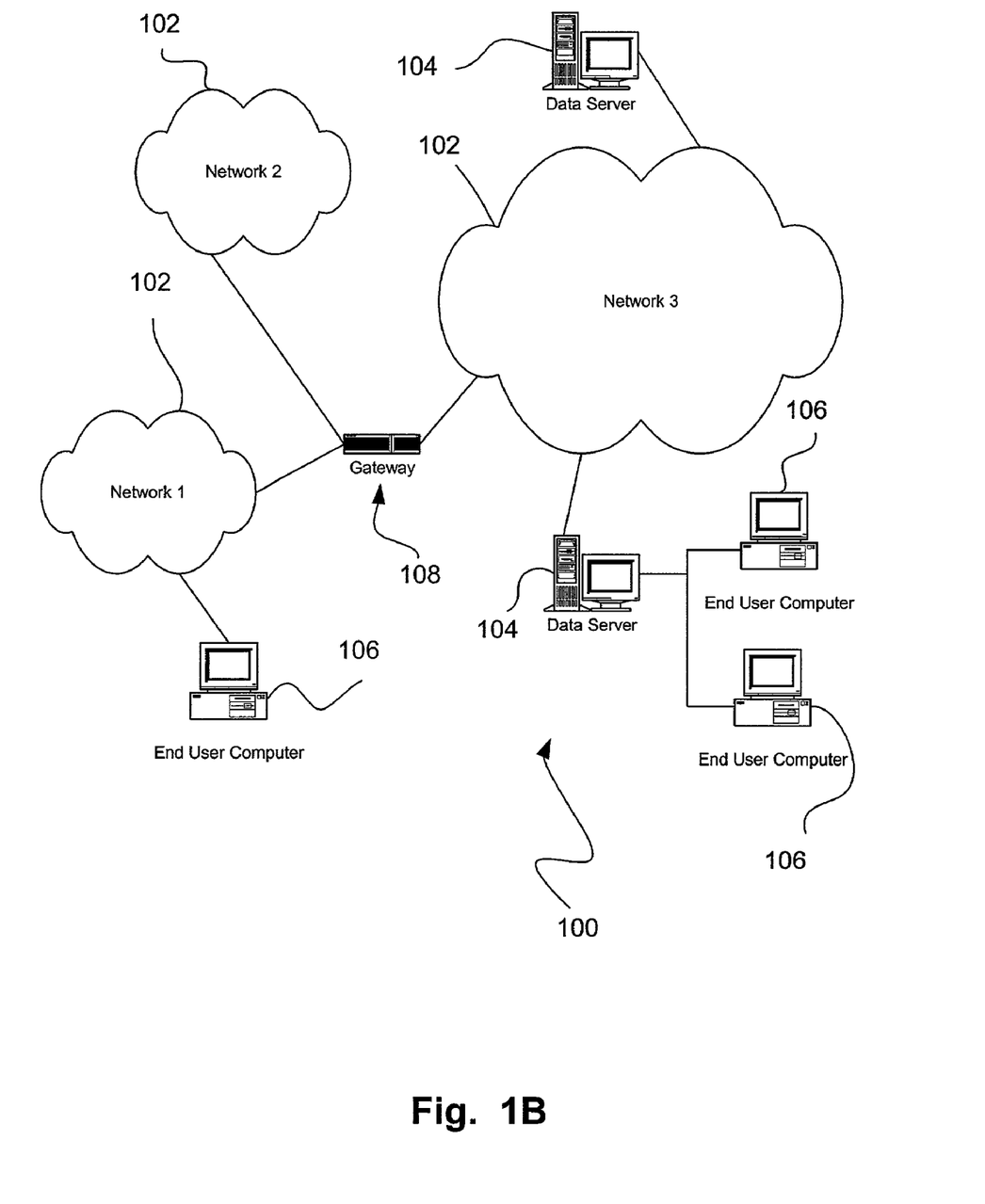
FIG. 1B illustrates a network architecture, in accordance with one embodiment.

FIG. 1B illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway 108 is coupled therebetween. It should be noted that each of the foregoing network devices as well as any other unillustrated devices may be interconnected by way of a plurality of network segments.

Coupled to any one of the foregoing components and/or segments may be a tool. In the context of the present description, this tool may include a security application program, a network analyzer application program, or any other type of application program that processes data capable of being communicated over a network such as the Internet. One exemplary network analyzer application program that may be used is the SNIFFER® product manufactured by NETWORK ASSOCIATES, INC®.

In use, the application program is adapted for decrypting network communications. Initially, encrypted network communications are identified. A key is then received. Such key is subsequently utilized to decrypt the encrypted network communications. In use, the key is conditionally received based on predetermined criteria. More information regarding one exemplary implementation of such functionality will be set forth hereinafter in greater detail.

Figure 2:
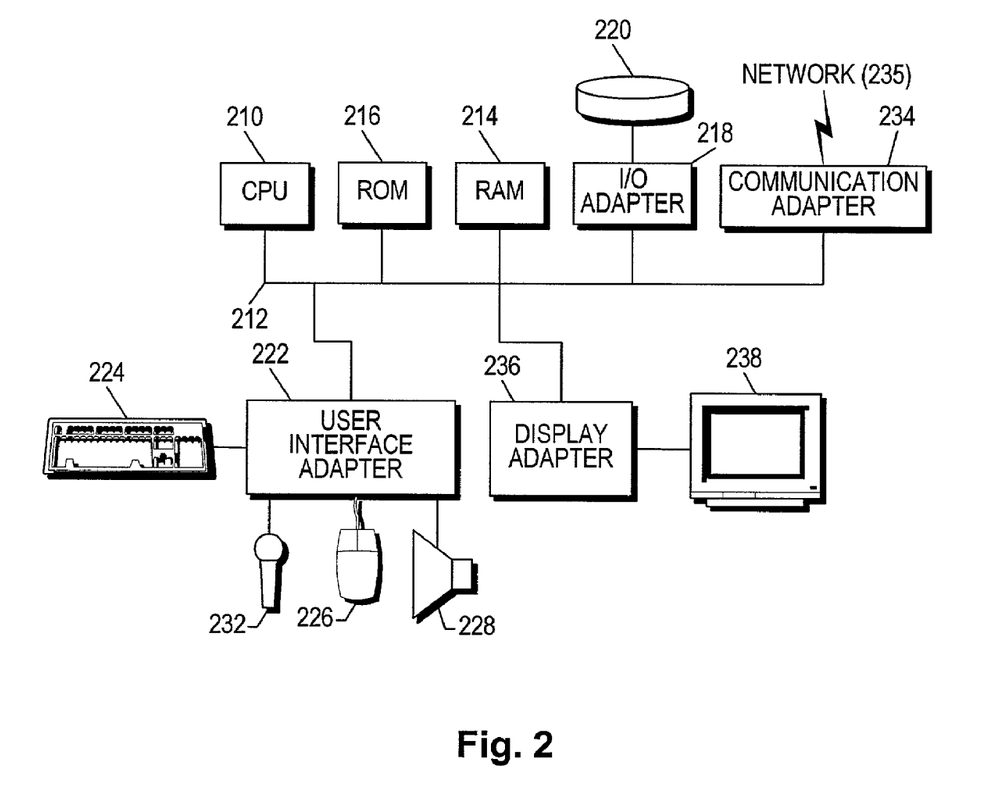
FIG. 2 shows a representative hardware environment that may be associated with the data servers and computers of FIG. 1B, in accordance with one embodiment.

FIG. 2 shows a representative hardware environment that may be associated with the data server computers 104 and/or end user computers 106 of FIG. 1B, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology.

Figure 3:
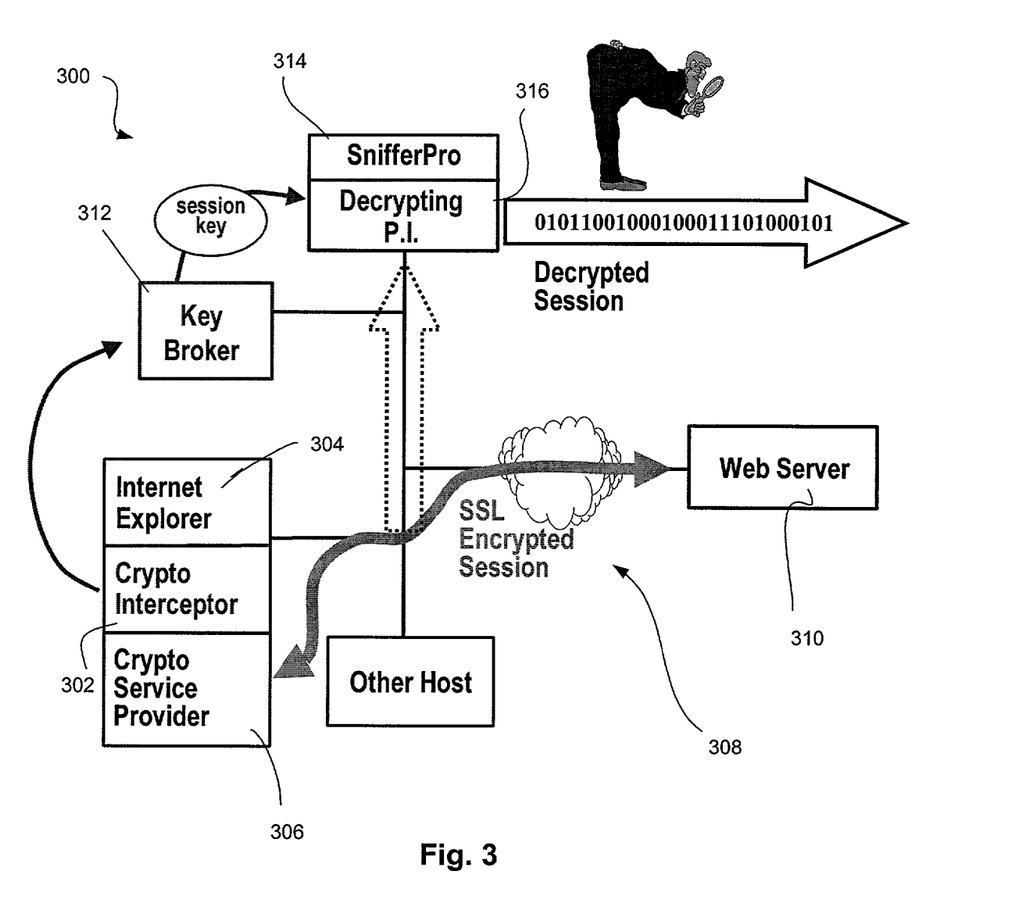
FIG. 3 illustrates an exemplary framework with which one embodiment may be carried out.

FIG. 3 illustrates an exemplary framework 300 with which one embodiment may be carried out. In one embodiment, the framework 300 may be implemented in the context of the aforementioned architecture of FIGS. 1B and 2. Of course, the present framework 300 may be implemented in any desired context.

As shown, the framework 300 includes a cryptographic interceptor module 302 coupled between an application 304 and a cryptographic supplier 306 for intercepting keys. In the context of the present description, the application 304 may include any application program that communicates utilizing a network 308 (i.e. communication involving a web server 310). Just by way of example, the application 304 may include a network browser (i.e. MICROSOFT® INTERNET EXPLORER®). Still yet, the cryptographic supplier 306 may include any cryptography module (i.e. hardware, software, etc.) that enables encrypted network communications [i.e. secure socket layer (SSL), etc.] by supplying keys.

As an option, the cryptographic interceptor module 302 may include a "shim" between the application 304 and the cryptographic supplier 306. In another embodiment, the cryptographic interceptor module 302 may be integral with the application 304 and/or cryptographic supplier 306. Of course, the cryptographic interceptor module 302 may take any form capable of intercepting keys generated by the cryptographic supplier 306. In use, the cryptographic interceptor module 302 conditionally intercepts the keys based on a policy. More information regarding such functionality will be set forth during reference to FIG. 4A.

Also included is a key broker module 312 coupled to the cryptographic interceptor module 302 for receiving the keys therefrom and storing the same. In use, the key broker module 312 interfaces with a tool 314 for conditionally providing keys thereto. In the context of the present description, the key broker module 312 may include any intermediary device or person that interfaces between the cryptographic interceptor module 302 and the tool 314. Of course, the key broker module 312 may be coupled separately or integrally to the cryptographic interceptor module 302 and/or the tool 314. As mentioned before, the tool 314 may include a security application program, a network analyzer application program, or any other type of application program that processes data capable of being communicated over a network.

In use, the tool 314 is adapted for identifying encrypted network communications, requesting at least one of the keys from the key broker module 312, and utilizing the at least one key to decrypt the encrypted network communications. It should be noted that this may be accomplished using the tool 314 itself, or a tool 314 modified by a plug-in 316 or the like.

A system framework 300 is thus provided that selectively and securely shares the keys used to encrypt the traffic with authorized third parties. The framework 300 enables trusted third parties, for example network administrators or software that automatically analyzes network traffic, to create a "window" into the encrypted traffic by decrypting it. In order to do this, at least one of the end points in the protocol (i.e. cryptographic interceptor module 302), or "supplier", sends keys used to encrypt the traffic to the key broker module 312. Tools 314 that use the keys to decrypt the traffic, the "consumers", then request the keys from the key broker module 312. The key broker module 312 then sends the keys to the consumers who then use the keys to decrypt the traffic.

Figure 4A:
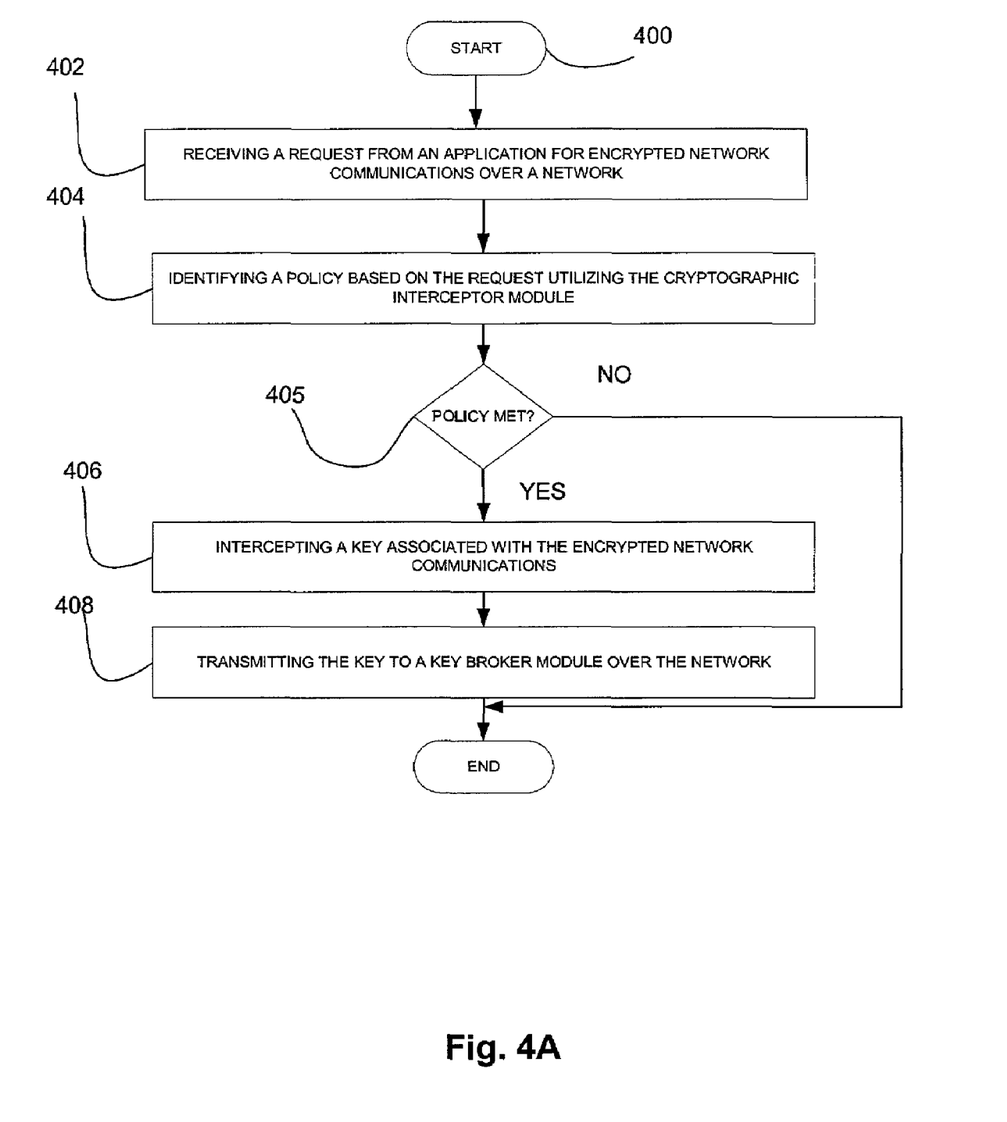
FIG. 4A illustrates a method associated with the cryptographic interceptor module of FIG. 3, in accordance with one exemplary embodiment.

FIG. 4A illustrates a method 400 associated with the cryptographic interceptor module 302 of FIG. 3, in accordance with one exemplary embodiment. It should be noted that the present method 400 may implemented in the context of the aforementioned cryptographic interceptor module 302 of FIG. 3, or in any desired context.

As shown, a request is first received in operation 402. For example, such requested may be initiated by an application (see, for example, the application 304 of FIG. 3) for encrypted network communications over a network. Further, the request may be received utilizing a cryptographic interceptor module (see, for example, the cryptographic interceptor module 302 of FIG. 3). In the case where the application is a network browser, this request may, in one embodiment, be initiated by selecting an encryption option or the like.

In response to such request for encrypted network communications, a policy is identified based on the request utilizing a cryptographic interceptor module. Note operation 404. As will soon become apparent, this is accomplished in order to decide whether to share the key by sending the same to a key broker module.

For example, an application used by the CEO of a corporation may be exempted from key sharing. The cryptographic interceptor module may know which user is currently logged in and be aware that the CEO is initiating an encrypted session, in order that the keys are not shared with any consumer. The keys may also be selectively shared based on the end points of the connection. The configuration applied to key sharing could, for example, exempt sites of a personal nature like online banking services. The cryptographic interceptor module can also selectively share keys based on the type on consumer. If the consumer is a daemon process which needs to see network traffic to ensure network security, such as an intrusion detection system, the cryptographic interceptor module can be configured to always share keys with such consumers. If the consumer is an interactive process (under control of a human user), such as a network analyzer, the cryptographic interceptor module can be configured to never share keys. Each of these options can be set to override another's in a rule-based manner. Of course, the policy could indicate that a key is always shared. Any of these or other factors may thus be embodied in the key sharing "policy". Each supplier (i.e. cryptographic interceptor module) in the system may contain a policy, which can be unique for that supplier and include any rule associated with the intercepting and/or sharing of keys.

More information will now be set forth regarding an embodiment where keys are selectively shared based on end points. Any encryption protocol that has authentication must, by definition, identify the end points of the communication uniquely. This trait may be used to create a mapping between the identification material in the protocol itself and the identity of the end point. The cryptographic interceptor module may be equipped with a list of identification material, each entry of which identifies an exempted site. As the cryptographic interceptor module is running, it may check the identification material it is given against the list of the identification material of exempted end points. If the identification material it detects matches one on the list, the cryptographic interceptor module may not send the key associated with that identification material to the key broker module.

Figure 7:
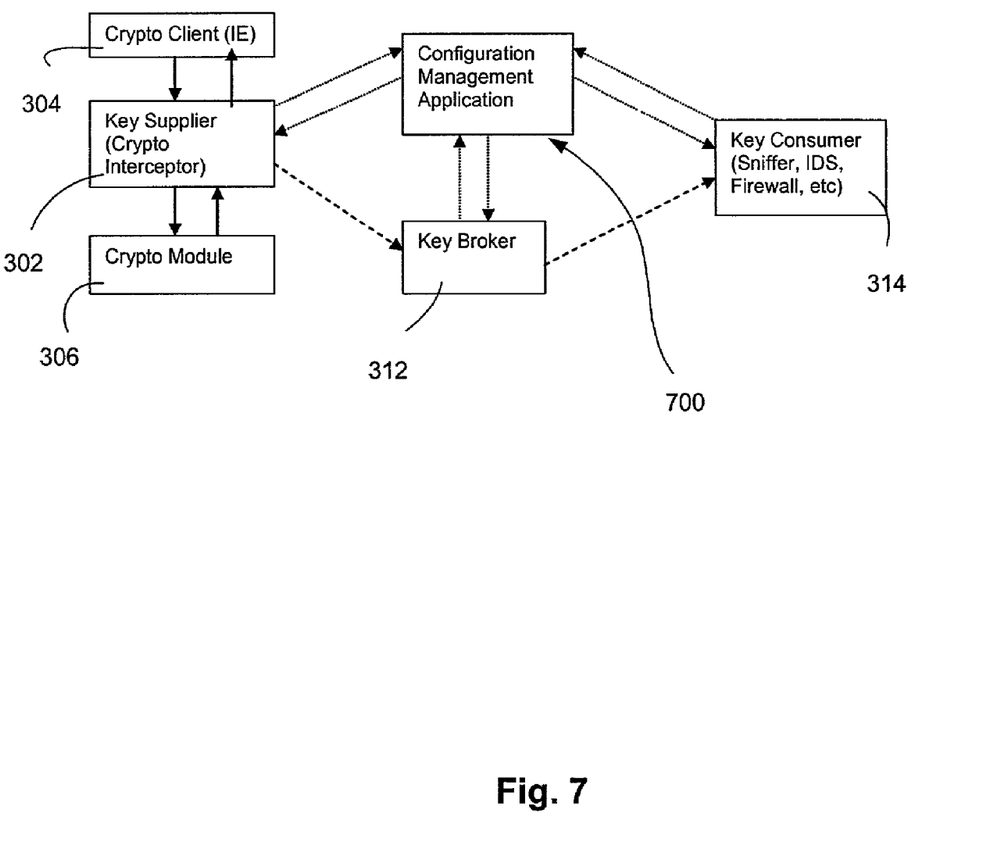
FIG. 7 illustrates an alternate embodiment including a configuration management application (CMA).

In an exemplary SSL embodiment, the SSL protocol requires the server to send a certificate chain to the client. The server certificate may then become the "identification material" described above in the previous embodiment. To authenticate the server certificate, the SSL application may make a cryptographic call that is intercepted by the cryptographic interceptor module. At this point, the server certificate is in hand and any data can be extracted. Since the certificate uniquely identifies the server, the cryptographic interceptor module can selectively filter keys based on information in the certificate. When the cryptographic interceptor module is passed a certificate, it checks the public key in the certificate against a list of exempted public keys. If the certificate contains one of these keys, the cryptographic interceptor module marks any session or short term keys generated that are associated with that public key as not sharable. As an option, the public keys may be extracted from server sites and put in a flat file on the system where the cryptographic interceptor module is running. In a fully developed system, a configuration management application (CMA) may gather the identification material out of band and push it to the cryptographic interceptor module. Thus, if a protocol does identification and authentication, which most do, the cryptographic interceptor module can use that identification information to uniquely identify the end points of communication.

While a public key is mentioned herein, it should be noted that any identification information in the certificate may be used in the context of the present embodiment. More information regarding such CMA will be set forth later in greater detail during reference to FIG. 7.

With continuing reference to FIG. 4A, it is then determined whether the policy or policies are met in operation 405. If so, a key associated with the encrypted network communications is intercepted utilizing the cryptographic interceptor module, as indicated in operation 406. It should be noted that operation 406 may precede decision 405, if required by the policy. Next, such the key is transmitted to a key broker module (see, for example, the key broker module 312 of FIG. 3) over the network. Note operation 408.

As an option, the user of the application may be notified of any key intercepting/sharing, if the user is not exempt from key-sharing. Further, the user may be given the opportunity to selectively receive such notification each time a key is shared, and even stop key-sharing by exiting the application.

The key may be protected during transit to the key broker module by public key cryptography. In such embodiment, the cryptographic interceptor module encrypts the keys using a consumer public key. The key broker module may, in one embodiment, never have access to the session key directly. Further, the key broker module may automatically or manually delete the keys stored therein after a predetermined amount of time.

The key broker module thus acts as a temporary storage location for session keys. A key broker module interface allows keys to be deposited and indexed by a unique ID and retrieved by the same ID. The value of the ID may be dependent on the key itself or on the protocol that is used. More information regarding the process of retrieving keys from the key broker module will now be set forth.

Figure 4B:
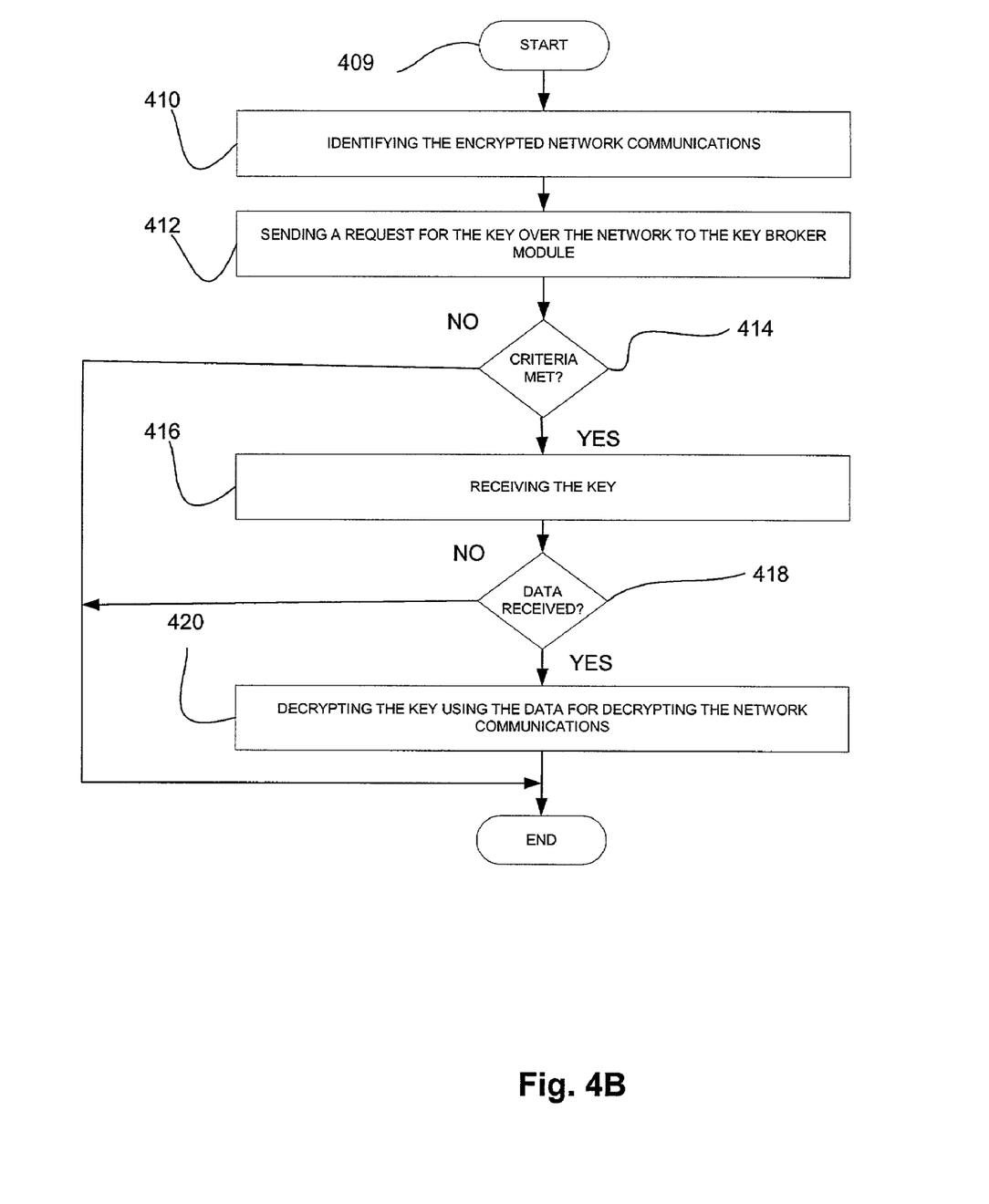
FIG. 4B illustrates a method associated with the tool of FIG. 3, in accordance with one exemplary embodiment.

FIG. 4B illustrates a method 409 associated with the tool 314 of FIG. 3, in accordance with one exemplary embodiment. It should be noted that the present method 409 may implemented in the context of the aforementioned tool 314 of FIG. 3, or in any desired context.

Initially, in operation 410, encrypted network communications are identified utilizing a tool (see, for example, the tool 314 of FIG. 3). Next, in operation 412, a request for the key is sent over the network to a key broker module (see, for example, the key broker module 312 of FIG. 3) utilizing the tool. It should be noted that access to the key broker module may be restricted to predetermined hosts.

Moreover, such request may include various information. For example, the information may include an identifier identifying the consumer operating the tool, or the tool itself. Still yet, the information may include any other data that may be used to restrict access to the requested key.

It is then determined in decision 414 as to whether the information meets predetermined criteria. If so, the key may be received at the tool from the key broker module. Note operation 416. By this design, only authorized tools, consumers, and/or sites may be granted access to the key and the encrypted data.

Figure 5:
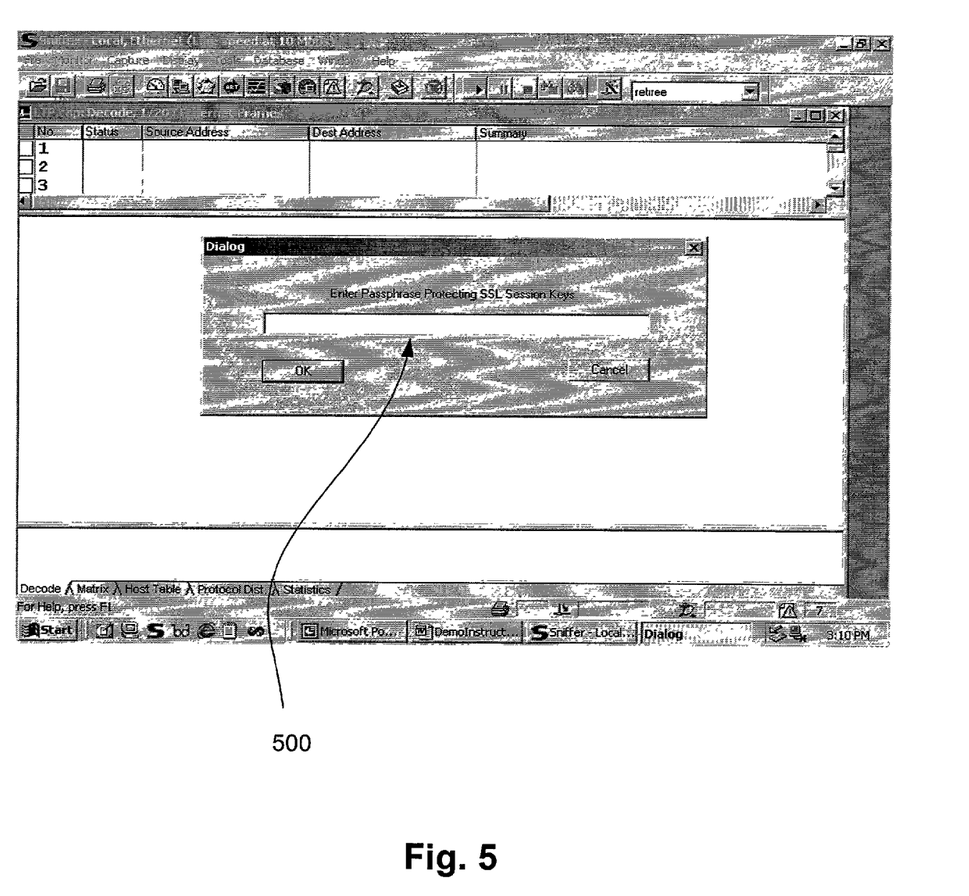
FIG. 5 illustrates an exemplary interface for receiving data for decrypting a key received from a key broker module.

It should be noted that the key may, in one embodiment, be encrypted itself. In decision 418, the consumer may be prompted for data (i.e. a password, passphrase, key, etc.) for decrypting the key. FIG. 5 illustrates an exemplary interface 500 for receiving such data for decrypting a key received from a key broker module. Thus, only authorized consumers of the authorized tools and/or sites may be granted access to the key and the encrypted data.

Figure 6A:
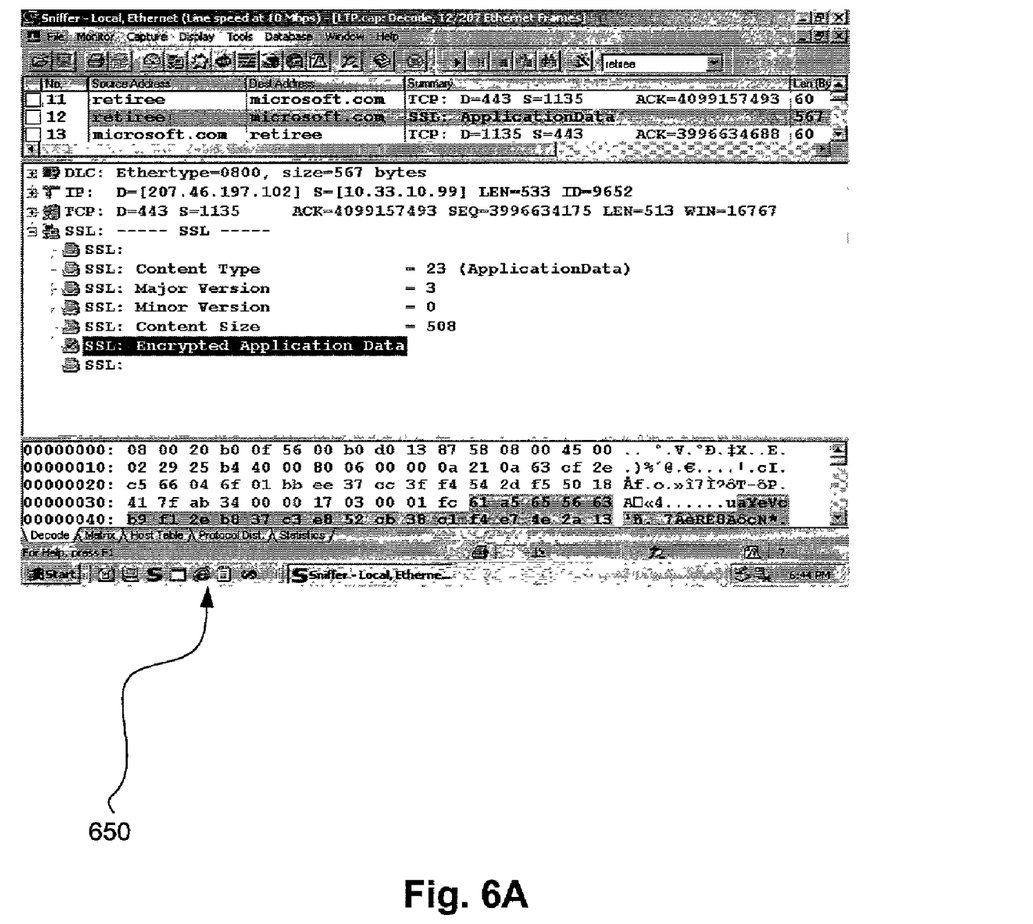
FIG. 6A illustrates an interface associated with a network analyzer which is not capable of decryption, as a result of a lack of user verification.

If such data is not successfully received, the network communications may be displayed by the tool in a limited manner, since decryption is not possible. FIG. 6A illustrates an interface 650 associated with a network analyzer which is not capable of decryption, as a result of a lack of consumer verification. As shown, opaque blocks are shown to represent encrypted data, etc.

Figure 6B:
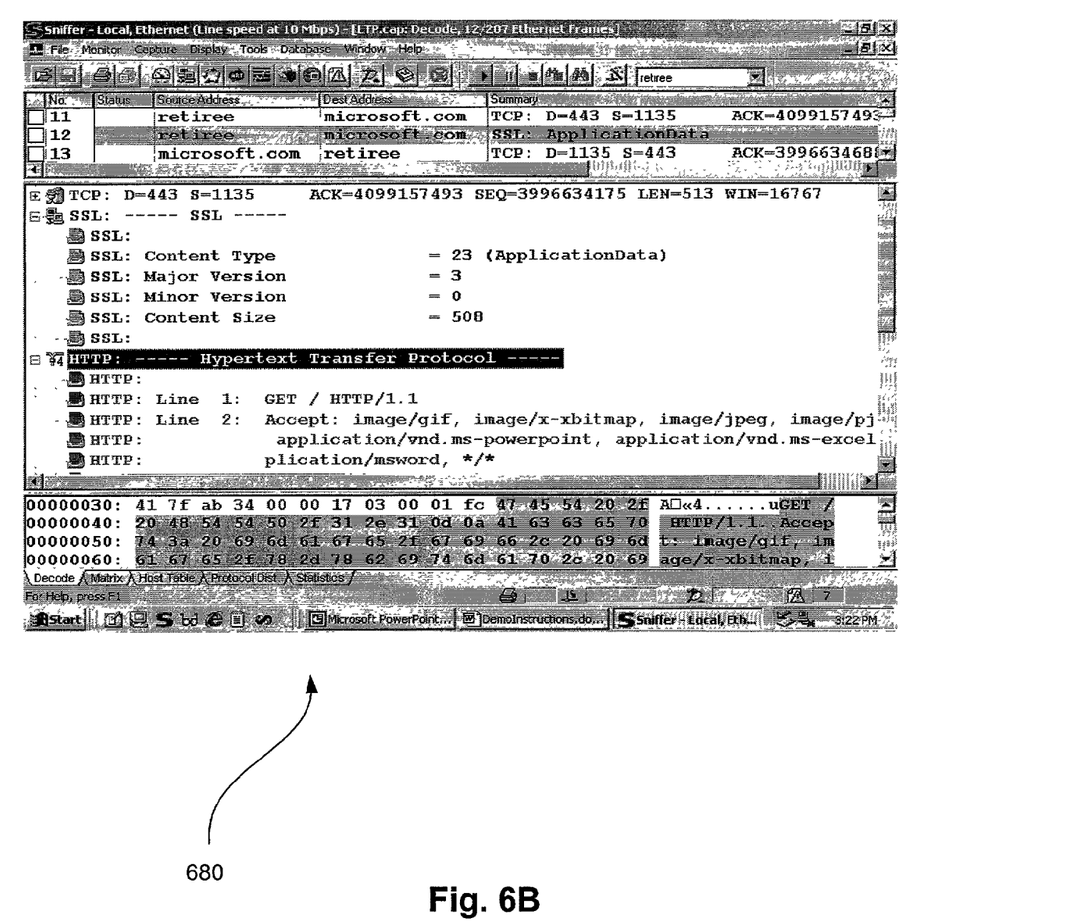
FIG. 6B illustrates an interface associated with a network analyzer which is capable of decryption.

If, however, such data is successfully received, the key may be used to decrypt the network communications for use by the tool. Note operation 420. FIG. 6B illustrates an interface 680 associated with a network analyzer which is capable of decryption. Optionally, the encrypted network communications may be saved with the accessed key so that such data may be decrypted upon retrieval.

As an option, the various data of Table 1 may be tracked for logging purposes during use.

TABLE 1

Extraction and encryption of session keys for consumers
Consumer retrieval of session keys
Consumer decryption failure In an embodiment where the tool may read data off a network, the tool may have access to an unencrypted protocol handshake. The cryptographic interceptor module and tool may use something unique in the handshake to create the aforementioned key ID used to retrieve the key from the key broker module. For example, in an SSL protocol handshake, there may be a series of bytes called the "client random data" which uniquely identifies the session. The cryptographic interceptor module may deposit the session key associated with that client random data with the key broker module using the client random data as the key ID. The consumer may then get the client random data off the network and query the key broker module for the key with that ID.

In the context of an embodiment where the tool includes a network analyzer, there may be times when one needs to send captured network traffic outside an organization for analysis. A utility could make this easier by re-encrypting the session keys for a capture file for analysis by another organization. The re-encryption may take place only when the network analyzer consumer is a valid consumer of the original session keys. The utility may modify the encrypted session keys. It may even delete session keys for sessions that the organization does not want shared. The utility may re-encrypt the session information for those sessions the organization wishes to make visible. The re-encryption would be to a key that was created for the purpose of sharing the files. This would allow an organization to share an existing file with another organization without sharing its private key.

FIG. 7 illustrates an alternate embodiment including a configuration management application 700 (CMA). The CMA 700 may keep track of all configuration details of the system: network address of key repositories, key suppliers, key consumers, component certificates, and other implementation details. The CMA 700 dynamically pushes system changes to components affected by the change. The dynamic nature of the CMA 700 serves to minimize the use of network resources. In a static system, every key supplier would have to deposit every key for every consumer in the key broker module even if there is no consumer that needs it. In the dynamic system, a consumer may tell the CMA 700 that it needs keys, the CMA 700 notifies its suppliers that there is an active consumer, and then the suppliers start depositing keys with the key broker module. At this point, the consumers have access to the keys and use them to decrypt the sessions. When the consumer is no longer interested in decrypting data, it sends a message to the CMA 700. The CMA 700 then notifies the suppliers, which then stop depositing keys with the key broker module. Another advantage to a dynamic system is that consumers, repositories, and suppliers can be added to the system dynamically. When a new supplier starts, it sends a message to the CMA 700 announcing its availability.

Communication between the CMA 700 and other system components may be encrypted (if desired) and authenticated using existing public key cryptography methods. In one embodiment, there may be one CMA 700, possibly more than one key broker, and multiple instances of suppliers and consumers.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A system, comprising:
a cryptographic interceptor module coupled between an application and a cryptographic supplier for intercepting keys, the application residing on a first computer;
a key broker module coupled to the cryptographic interceptor module for storing the keys, the key broker module residing on a second computer coupled to the first computer via at least one network for receiving the keys from the cryptographic interceptor module on the first computer via the at least one network; and
a tool coupled to the key broker module, the tool adapted for identifying encrypted network communications, requesting at least one of the keys, and utilizing the at least one key to decrypt the encrypted network communications, the tool residing on a third computer coupled to the second computer via the at least one network for receiving the at least one key from the key broker module on the second computer via the at least one network;
wherein the system is operable such that the cryptographic interceptor module conditionally intercepts the keys based on a policy;
wherein the cryptographic interceptor module includes a shim between the application and the cryptographic supplier; and
wherein the key broker module does not receive the keys from the cryptographic interceptor module if it is determined that the tool is an interactive process under control of a human user.

2. The system as recited in claim 1, wherein the at least one key is used to decrypt the encrypted network communications by utilizing a security program.

3. The system as recited in claim 1, wherein the at least one key is used to decrypt the encrypted network communications by utilizing a network analyzer.

4. The system as recited in claim 1, wherein the key broker module conditionally receives the keys based on the policy.

5. The system as recited in claim 4, wherein the policy includes information associated with a user receiving the encrypted network communications, a web site associated with the encrypted network communications, and a process type receiving the encrypted network communications.

6. The system as recited in claim 4, wherein the policy is unique to the cryptographic interceptor module.

7. The system as recited in claim 1, wherein the key broker module conditionally receives the keys from the cryptographic interceptor module.

8. The system as recited in claim 7, and further comprising receiving a request from the application for the encrypted network communications over the network utilizing the cryptographic interceptor module, identifying the policy utilizing the cryptographic interceptor module, and conditionally sharing the at least one key with the key broker module based on the policy utilizing the cryptographic interceptor module.

9. The system as recited in claim 1, wherein the keys are received in response to a request.

10. The system as recited in claim 9, wherein the request includes information.

11. The system as recited in claim 10, wherein the keys are conditionally received based on whether the information meets predetermined criteria.

12. The system as recited in claim 1, wherein the at least one key is encrypted.

13. The system as recited in claim 12, wherein the at least one key is decrypted based on user input.

14. The system as recited in claim 1, wherein the at least one key is indexed.

15. The system as recited in claim 1, wherein the key broker module conditionally receives the keys based on end points of a connection.

16. The system as recited in claim 1, wherein the key broker module conditionally receives the keys based on a type of the tool.

\* \* \* \* \*